US005287265A

United States Patent [19]

Hall et al.

[11] Patent Number: 5,287,265

[45] Date of Patent: Feb. 15, 1994

[54] INTERFACING METHODS FOR USE IN INPUTTING OPERATOR-SELECTABLE CONTROL PARAMETERS TO A CENTRIFUGE INSTRUMENT

[75] Inventors: Richard A. Hall, Southbury; Gary J. Mello, Naugatuck, both of Conn.

[73] Assignee: E. I. Du Pont de Nemours and Company, Wilmington, Del.

[21] Appl. No.: 832,539

[22] Filed: Feb. 7, 1992

[51] Int. Cl.[5] ........................ G05B 15/00; B04B 13/00

[52] U.S. Cl. ...................................... 364/188; 494/10; 494/11

[58] Field of Search ............................ 494/10, 11, 14; 364/188, 189, 745, 502, 709.01, 709.12, 709.15, 709.16, 710.01, 710.1, 710.08; 340/791, 792, 825.19; 210/85, 138, 141, 143

[56] References Cited

U.S. PATENT DOCUMENTS

| | | | |
|---|---|---|---|
| 3,786,480 | 1/1974 | Hatano et al. | 364/710.1 |
| 4,244,513 | 1/1981 | Fayer et al. | 494/11 |
| 4,322,029 | 3/1982 | Gropper et al. | 494/11 |
| 5,005,116 | 4/1991 | Fujita et al. | 364/188 |

OTHER PUBLICATIONS

DuPont, Sorvall RC-M100 and RC-M120 Micro-Ultracentrifuges, Operating Instructions, Mar. 1990, title page, pp. 3-2, 3-6.

Du Pont, Sorvall RCM120 Micro-Ultracentrifuge Brochure, pp. 1-8, Jan. 1990.

Beckman Instruments Inc., Preparative Ultracentrifuges Instruction Manual, pp. 1-3; 2-2; 2-5; 1-8 through 2-11, 2-13, 2-14, Jul. 1990.

*Primary Examiner*—Jerry Smith

*Assistant Examiner*—Steven R. Garland

[57] ABSTRACT

An interface method for inputting operator-selectable values for speed, temperature and time control parameter are disclosed.

15 Claims, 2 Drawing Sheets

18
30
SCREEN
INTEGER WIDTH
INTEGER LENGTH
METHODS
DISPLAY
FIELD MANAGER
EDITOR
STRING TEXT
STRING TITLE
STRING PIC
METHODS
PROCESS A KEY
BUFFER TO TEXT
SHOW FIELD
EDITOR
CHARACTER ARRAY BUFFER (MEMORY)
Integer Length
METHODS
SHIFT RIGHT (integer number)
SHIFT LEFT (integer number)
APPEND CHARACTER
PLACE CHARACTER

INTERFACING METHODS FOR USE IN INPUTTING OPERATOR-SELECTABLE CONTROL PARAMETERS TO A CENTRIFUGE INSTRUMENT

BACKGROUND OF THE INVENTION

1. Field of the Invention

The present invention relates to operator interfacing methods for inputting operator-selectable control parameters to a centrifuge instrument.

2. Description of the Prior Art

A centrifuge instrument is a device operable to expose a liquid sample carried within a centrifuge rotor to a centrifugal force field. The rotor is mounted on the upper end of a drive spindle that projects into an enclosed chamber. Typically, a cooling arrangement is provided whereby the temperature of the sample may be controlled for the centrifuge run.

The most common operator-selectable control parameters of a centrifuge run are: (1) rotor angular velocity ("speed") and its associated parameter (2) relative centrifugal force ("RCF"), (3) sample temperature, and (4) duration of the run. The unit for relative centrifugal force is ("xG"), where G is force due to gravity.

For instruments operating in the so-called "ultraspeed" regime it is common that the angular velocity needed to perform a selected protocol may lie in the range from approximately twenty thousand through approximately eighty to one hundred thousand revolutions-per-minute (rpm). The value of relative centrifugal force to which a sample is exposed during a run is dependent both upon the rotor speed and the distance of the sample from the axis of rotation. Values of this parameter in excess of one hundred thousand xG are common.

For the large majority of protocols (on the order of seventy-five percent) a sample temperature of four degrees (4° C.) is used. A lesser but still significant number of protocols (on the order of an additional fifteen percent) require a sample of temperature twenty degrees (20° C.). The remainder of protocols may require an alternative temperature value between 0° C. and 40° C.

The time duration for a centrifuge run is either implemented using an "elapsed time" mode or an indefinite time ("HOLD") mode. In the former the centrifuge run extends for a time period selected by the operator. The run is automatically terminated at the end of that period. In the latter mode the centrifuge run continues until it is manually terminated by the operator.

Most operator manipulable control panels for centrifuge instruments include a speed parameter function control key, a temperature parameter function control key, a time parameter function control key, and a time "HOLD" parameter function control key. The numeric values for the selected speed parameter, temperature parameter and time parameter are input to the instrument using a ten-digit (zero through nine) control pad. The indefinite time mode is input using the separate "HOLD" function control key. The operator's choices of settings for the various parameters are displayed in respective display fields provided on a visual display. An "ENTER" key transmits a command to the microprocessor-based instrument controller. A "START" key is normally used to execute a run having the selected parameter settings.

Presently, in instruments such as the RC-28S Supraspeed TM instrument manufactured and sold by Biotechnology Systems Division of E. I. duPont de Nemours the set value of the speed parameter is input serially, with the entry of each digit shifting the previously-entered digit(s) to the left by one place. All of the digits must be entered, even if the set value is an even multiple of either one hundred or one thousand.

Efforts have been made to simplify the inputting of the various operator-selectable control parameters to the controller.

For example, in the case of selection of rotational speed, an operator interface is used on instruments manufactured by Beckman Instruments and sold as Optima TM Series preparative ultracentrifuge. With this interfacing technique, it is presumed that the desired speed parameter is an even multiple of one-hundred, and that regulation of the speed parameter to a resolution finer than one hundred rpm is not desired. Upon entry, each digit of the speed parameter value is initially displayed in the hundred's place on the display field. Prior significant digits are shifted to the left upon the entry of each successive digit.

A variation of the above-described interfacing technique when rotational speed is entered is practiced in the instrument sold by Biotechnology Systems Division of E. I. duPont de Nemours as the RC-M-120 micro-ultracentrifuge. With this interfacing technique it is presumed that the desired speed parameter is an even multiple of one-thousand. Upon entry each digit of the speed parameter value is initially displayed in the thousand's place on the display field. Earlier entered significant digits are shifted to the left upon the entry of each successive digit.

In both of the above-referenced instruments the entry of the time parameter value is set using either the time function control key (followed by the entry of the digits of the desired time value if a predetermined elapsed time value is desired), or, after depressing the time function control key, using the separate "HOLD" function control key (if the indefinite time mode is desired).

In the same instruments the temperature set value is input using the temperature parameter function control key, with the desired temperature value being serially entered.

SUMMARY OF THE INVENTION

The present invention relates to interfacing methods for the inputting of operational parameter values by an operator of a centrifuge instrument.

In one aspect the interface technique of the present invention presumes that the desired speed or RCF value is a multiple of one thousand. However, input of speed or RCF with greater resolution is afforded. The speed parameter is an N-significant digit number comprising a first and a second subset of significant digits. Upon entry by an operator of the first subset of significant digits, the same are displayed as the product of a first multiplier (e.g., one thousand). Starting with the entry by an operator of one of the digits in the second subset, the value of the operational parameter being entered is displayed as a product of a second, different (and preferably lesser), multiplier (e.g., one).

In another aspect, the method for inputting the temperature parameter is addressed. In response to a first assertion of a temperature control function, a first default temperature value is selected and displayed in accordance with the last-used operating temperature value and the following first schedule:

(i) if the stored last-used operating value of the temperature parameter is other than the first or the second default values, a first default value (e.g., 4° C.) is selected, or (ii) if the stored last-used operating value of the temperature parameter is the first default value, a second default value (e.g., 20° C.) is selected, or (iii) if the last-used operating value of the temperature parameter is the second default value, the first default value (e.g., 4° C.) is selected.

The first schedule may be summarized by stating that if the last-used operating value of the temperature parameter is not equal to a first default value (e.g., 4° C.) assertion of the temperature control function key causes the first default value to be displayed. If the last-used operating value of the temperature parameter is equal to the first default value assertion of the temperature control function key causes a second default temperature value to be displayed.

If a second assertion of a temperature control function is performed, the displayed value is set by a second schedule, which is effectively a toggling from the first default value to the second default value, or vice versa, depending upon the default value selected in accordance with the first schedule.

In yet another aspect, a method for inputting an operator-selectable time control mode is provided. In response to the assertion of a time control function key, a time control mode is selected and displayed in accordance with the following schedule:

(i) if the last-used time mode is the elapsed time mode, the indefinite time mode ("HOLD") is selected, or (ii) if the last-used time mode is the indefinite time mode ("HOLD") the elapsed time mode is selected, an operator selected elapsed time value may then be input. Using the present invention, manipulation of only a single function control key is required.

BRIEF DESCRIPTION OF THE DRAWINGS

The invention will be more fully understood from the following detailed description thereof, taken in connection with the accompanying drawings, which form a part of this application, and in which.

DETAILED DESCRIPTION OF THE INVENTION

Figure 1:
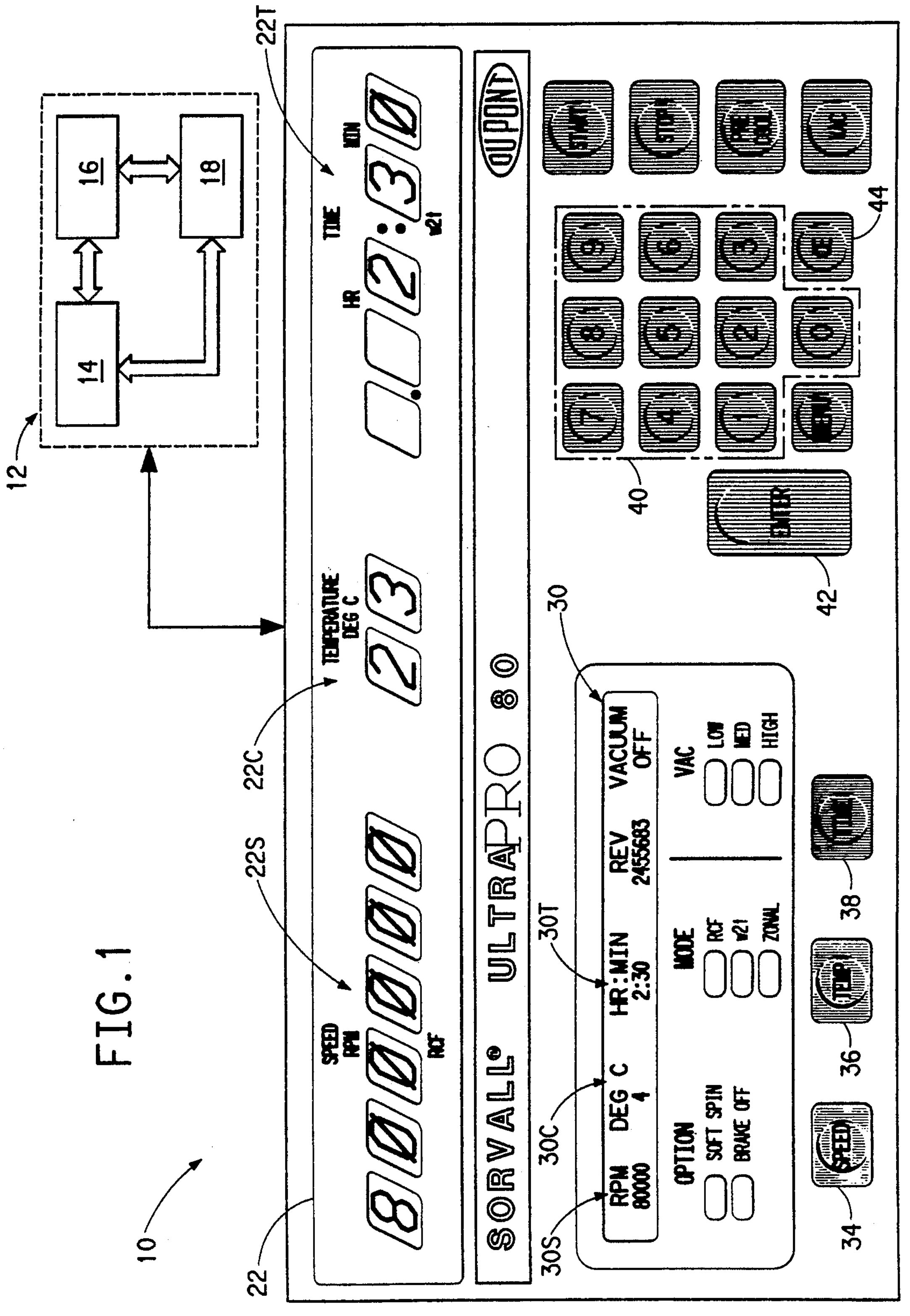
FIG. 1 is illustration of an operator control panel with which the interfacing methods of the present invention may be used.

Throughout the following detailed description, similar reference numerals refer to similar elements in all Figures of the drawings.

With reference to FIG. 1 shown are the features of an operator-manipulable control panel 10 for a centrifuge instrument that have relevance in connection with the present invention. The panel 10 forms an input/output port for a microprocessor-based controller diagrammatically indicated by the reference character 12. The controller 12 is preferably implemented using an IBM-XT processor 14 and associated memory 16. The controller 12, for the purposes of this application, utilizes a field manager program 18 to control the panel 10. As may be appreciated from FIG. 2 in the preferred instance the program 18 is implemented in an object oriented programming language such as Borland C++ programming language.

The panel 10 includes a first, on-going or "RUN", display 22 for displaying to an operator the actual status of various operational parameters of the instrument on an on-going basis. The display 22 includes a six significant digit speed display field 22S wherein the revolutions per minute ("rpm" or "RPM") or the relative centrifugal force ("RCF") count of a run is displayed. A two significant digit display field 22C displays the predicted temperature of the sample loaded in a rotor (in degrees-Centigrade) within the centrifuge chamber. The display 22 also has a time field 22T which includes a two significant digit hour field 22H and a two significant digit minute field 22M. It is noted that these two fields may be used in connection with an additional display position proximal thereto to display the total centrifugal force ($\omega^2t$) to which the sample has been exposed in exponential format.

The desired values selectable by an operator for a centrifuge run are displayed on a display screen generally indicated by the character 30. The display screen 30 includes three display fields 30S, 30C and 30T. Each display field contains a title line and a text (information) line. The field 30S, (having the title "RPM") is used to display set speed information in a display format ("pic") utilizing five significant digits. This field 30S may also be used to display a desired relative centrifugal force (title "RCF") count in a six-digit pic. The field 30C (having the title "DEG C") is used to display set temperature information in a display format ("pic") utilizing two significant digits. The field 30T (having the title "TIME") is used to display set time information in a display format ("pic") utilizing four significant digits separated into pairs by the character ":".

Beneath the display field 30 are a group of primary function keys, including a speed function control key 34 ("SPEED"), a temperature function control key 36 ("TEMP"), and a time function control key 38 ("TIME"). Depression of one of the function control keys 34 through 38 generates a signal to the microprocessor-based instrument controller 12 indicating that an operator wishes to input desired value settings (or "set values") for one or more of the speed/RCF, temperature and/or time parameters.

The numerical values of the various operational parameters to which the centrifuge may be set are input to the controller 12 using a ten-digit (zero through nine) control pad 40. An "ENTER" key 42 and a "CE" ("Clear Entry") key 44 are located proximally to the keypad. The ENTER key 42 transmits the set value of the parameter to the microprocessor where the information is stored in buffer memory locations in the memory 16. The CE key 44 acts as a destructive backspace, deleting the previous keystroke.

In the Examples presented hereinafter, the appearance of the text line of the various fields 30S, 30C and 30T is displayed for each of the key entries by an operator.

The present invention relates to interfacing methods for facilitating the input of operator-selectable values for centrifuge operation. In the preferred instances to be described the interfacing methods facilitate the input of set values for speed/RCF, run temperature and run time, it should be understood that the methods in accordance herewith may be used to input set values of other operational parameters.

SPEED AND RELATIVE CENTRIFUGAL FORCE

The input of operator-selected values for the rotational speed parameter and the relative centrifugal force parameter are first discussed. The values for speed and relative centrifugal force are input using the speed function control key 34, the keypad 40, and the ENTER key 42.

Each of these operational parameters is an N-significant digit number. In the case of the rotational speed the parameter value is usually a five significant digit number, while in the case of relative centrifugal force, the parameter value is usually a six significant digit number. In any case, however, the operational parameter value may be defined to have a first subset of n significant digits (with $n<N$) and a second subset (N-n) significant digits.

In accordance with the invention, should a speed/rcf value other than that used during the last run (and displayed in the set display field) be desired the speed function control SPEED key 34 is asserted. After assertion of the speed function control SPEED key 34, the entry by an operator of the first subset of significant digits causes the numerical value defined by that first subset of significant digits to be displayed in the set display field 30S as the product of a first multiplier (usually, one thousand). Starting with the entry by the operator of one of the digits in the second subset of significant digits, the value of the operational parameter being entered is displayed as a product of a second, different, multiplier (usually, one). Any convenient or desired values of the first and second multipliers may be selected, so long as the value of the first multiplier is greater than the value of the second multiplier.

The treatment of the selected parameter value in this manner defines an element of the QUIKset TM operator interface system, providing a form of data entry that satisfies the needs of the most typical instance of instrument usage in which the speed and/or relative centrifugal force values are selected in multiples of one thousand. However, the operator is also able to input speed and/or relative centrifugal force with a finer degree of resolution.

This aspect of the invention will be understood from the following Examples. (For purposes of this and other Examples it is assumed that an immediately preceding run was effected at 80,000 rpm, with 23° C. chamber temperature, for two hours, thirty minutes in the elapsed time mode.) It is also noted that the symbol "*" in this text indicates the presence of a blank "SPACE" character in the display field. It is also noted that in a preferred implementation of all of the Examples the display of the values being set may be caused to blink until the ENTER key 42 is asserted.

EXAMPLE 1A-1 INPUT OF SPEED PARAMETER

For this example it is assumed that the operator desires to exercise a protocol that requires a centrifuge run at 46,785 rpm. In accordance with this invention the speed parameter may be viewed as comprising two subsets of significant digits, a two significant-digit subset ("4" and "6") and a three significant-digit subset ("7", "8" and "5").

Once the speed function control SPEED key 34 is asserted the value of the speed used in the last run is displayed in the field 30S and is caused to blink indicating a change is requested. The entry of the first significant digit of the selected value of the operational parameter (4) causes the value of that significant digit to be stored in memory and to be displayed (blinking) in a position on the field 30S corresponding to the thousands place in a base ten notational system.

Thus (after assertion of the function control SPEED key 34) the text line in field 30S reads as follows:

Step (1): input "4" field 30S reads *4000

Upon the entry of the second significant digit of the selected value of the operational parameter ("6"), that value is stored in memory and is caused to be displayed (blinking) in a position on a visual display field 30S corresponding to the thousands place. The value of the first significant digit is shifted one position to the left and caused to be displayed in a position on a visual display corresponding to the ten-thousands place. Thus:

Step (2): input "6" field 30S reads 46000

The value of the first subset of significant digits is, in effect, displayed as if multiplied by a first factor of one thousand. The entry of the most common protocol speed values are thus enabled with a minimum of keystrokes.

In accordance with this invention, upon the entry of the third significant digit of the selected value of the operational parameter (i.e., the first digit in the second subset), that value is stored and displayed in the field 30S such that the value of the first significant digit ("4") is disposed in a place on the display corresponding to the hundreds place in a base ten notational system, the value of the second significant digit ("6") displayed in the place corresponding to the tens place, and the value of the third significant digit ("7") is displayed in the place on the display corresponding to the units place in a base ten notational system. Thus:

Step (3): input "7" field 30S reads **467

Each additional significant digit as entered is stored, and the additional value is displayed in the place on the display corresponding to the units place in a base ten notational system. The location on the display at which the previously-stored values are displayed is shifted by one place for each additional significant digit that is entered and stored in memory. This is repeated for each additional significant digit of the value of the operational parameter. Thus:

Step (4): input "8" field 30S reads *4678 and

Step (5) input "5" field 30S reads 46785

The ENTER key 42 is then asserted.

EXAMPLE 1A-2 INPUT OF SPEED PARAMETER

Should actual control of the instrument to the units value be impractical, the controller 12 may round the set value to the next-higher tens value. This value will be the speed value used for control and the speed value displayed to a subsequent user. If such impracticality becomes apparent, it may be desirable in some instances to use the value of ten (10) as the value of the second multiplier. In such an arrangement, in a modification of Example 1A-1 above, upon the entry of the third significant digit the value of that digit is stored in the buffer memory and the display caused to show (1) the value of the first significant digit in the thousands place in a base ten notational system, (2) the value of the second significant digit displayed in the hundreds place in a base ten notational system, and (3) the value of the third significant digit displayed in the tens place.

Thus, step (3) in the above Example 1A-1 would be displayed by the field manager on the text line of field 30S as:

Step (3): input "7" field 30S reads *4670

The next-subsequent step appears as:

Step (4): input "8" field 30S reads 46780

EXAMPLE 1A-3 INPUT OF SPEED PARAMETER

It should also be apparent that speed values having four or less significant digits may also be entered using the techniques of either Example 1A-1 or Example 1A-2 of this aspect of the present invention.

For example, if the desired speed value is 6785 rpm is desired, using the present invention the input and display sequence will be as follows, (with the predetermined first and second multipliers being 100 and 1, respectively). Thus (after assertion of the speed function control SPEED key 34):

Step (1): input "6" field 30S reads **600

Step (2): input "7" field 30S reads *6700

Step (3): input "8" field 30S reads **678

Step (4) input "5" field 30S reads *6785

The ENTER key 42 is then asserted.

If control to the units place is not practical, then the technique of Example 1A-2 is used, and the result of step (3) is modified to:

Step (3): input "8" field 30S reads *6780

EXAMPLE 1B INPUT OF RELATIVE CENTRIFUGAL FORCE VALUE

For this example it is assumed that the operator desires to exercise a protocol that requires an RCF value of 432,785×G. Once the RCF mode is selected indicating that the operator desires to input an RCF set value, the display of RCF parameter value is substantially similar to the display of the desired speed value, with the first and second subsets each containing, in this example, three significant digits. Each subset is otherwise identically treated as in Examples 1A. It is noted that since relative centrifugal force is dependent both upon rotor speed and the distance from the rotational axis of the rotor at which the force is calculated (typically "Rmax", the point at which the sample tube is furthest from the rotor axis), the value of the latter must be made available to the controller 12 in some fashion. This information may be available from a rotor recognition system if one is used in the instrument, or the operator may be prompted by the controller for such information.

Thus (after assertion of the speed function control SPEED key 34):

Step (1): input "4" field 30S reads **4000

Step (2): input "3" field 30S reads *43000

Step (3): input "2" field 30S reads 432000

Step (4): input "7" field 30S reads **4327

Step (5): input "8" field 30S reads *43278

Step (6): input "5" field 30S reads 432785

The ENTER key 42 is then asserted.

In some instances for display of RCF values it may be desirable to utilize alternative values such as 10,000 or 100,000 as the first multiplier.

TEMPERATURE

The interface method used on temperature control information in accordance with the present invention provides the ability to input any temperature value within the allowable range of the centrifuge (typically 0° C. to 40° C.) and leverages on the fact that a bimodal distribution of temperature values is sufficient to cover substantially all centrifuge applications. Using this invention an operator-selectable value for a temperature parameter value may be selected for the instrument run in the overwhelming majority of applications using only the temperature function control TEMP key 36. One of two predetermined default temperature values is displayed, based upon the value of the last-used operating temperature. One default value is four (4° ) degrees C., the primary default value, while the other default value is twenty (20° ) degrees C., the secondary default value. Of course, any suitable or desirable default values may be used.

In use, upon the first assertion of the temperature function control TEMP key 36 a first default temperature value is selected for display in the set display subfield 30C in accordance with the following first schedule:

(i) if the stored last-used operating value of the temperature parameter is other than the first default value (4° C.) or the second default value (20° C.), the first default value (4° C.) is displayed;

(ii) if the stored last-used operating value of the temperature parameter is the first default value (4° C.), the second default value (20° C.) is displayed; or (iii) if the last-used operating value of the temperature parameter is the second default value (20° C.), the first default value (4° C.) is displayed.

The first schedule may be summarized by stating that if the last-used operating value of the temperature parameter is not equal to a first default value (e.g., 4° C.) assertion of the temperature control function key causes the first default value to be displayed. If the last-used operating value of the temperature parameter is equal to the first default value assertion of the temperature control function key causes a second default temperature value to be displayed.

If necessary, in response to a second assertion of the temperature function control TEMP key 36 the previously displayed default temperature value is changed in accordance with the following second schedule:

(iv) if the first default value (4° C.) of the temperature parameter has been previously chosen in accordance with the first schedule, the displayed value of the temperature parameter is changed to the second default value (20° C.), or (v) if the second default value (20° C.) of the temperature parameter has been previously chosen in accordance with the first schedule, the displayed value of the temperature parameter is changed to the first default value (4° C.).

This aspect of the invention man be understood by the following examples. The assumption is again noted that unless expressly set forth an immediately preceding run was effected with a chamber temperature of 23° C.

EXAMPLE 2A PRIMARY TEMPERATURE PARAMETER VALUE

Condition a:

For this example it is assumed that the operator desires to exercise a protocol that requires a sample temperature of 4° C. The last-used temperature value (23° C.) is displayed in the field 30C. Upon the first assertion of the temperature function control TEMP key 36, in accordance with the first schedule set forth above, the first default temperature (4° C.) is displayed. Assertion of the ENTER key 42 finalizes this value of the temperature parameter. Thus, the text line of the field 30C would appear:

Prior to Step (1), field 30C reads 23
Step (1): input "TEMP" field 30C reads *4
The "ENTER" key 42 is then asserted.

Condition b:

The operator again desires a sample temperature of 4° C. If the last-used temperature value was 20° C. this value is displayed by the system in the set parameter subfield 30C. Since the preceding run used the second default temperature value, upon a first assertion of the temperature function control TEMP key 36 the first schedule mandates the display of the first default temperature (4° C.). Assertion of the ENTER key 42 finalizes this value of the temperature parameter. Thus:

Prior to Step (1), field 30C reads 20
Step (1): input "TEMP" field 30C reads *4
The ENTER key 42 is then asserted.

EXAMPLE 2B-SECONDARY TEMPERATURE PARAMETER VALUE

Condition a:

For this example it is assumed that the operator desires to exercise a protocol that requires a sample temperature of 20° C.

The last-used temperature value (23° C.) is displayed in the field 30C. Upon a first assertion of the temperature function control TEMP key 36, in accordance with the first schedule set forth above, the first default temperature (4° C.) is displayed. Upon a second assertion of the temperature function control key TEMP 36, in accordance with the second schedule, the second default temperature (20° C.) is displayed. Again, assertion of the ENTER key 42 finalizes this value of the temperature parameter. Thus:

Prior to Step (1), field 30C reads 23
Step (1): input "TEMP" field 30C reads *4
Step (2): input "TEMP" field 30C reads 20
The ENTER key 42 is then asserted.

Condition b:

The operator again desires to use the chamber temperature of 20° C. If the last-used temperature value was 4° C., this value is displayed by the system in the field 30C. Since the preceding run used the first default temperature value, upon a first assertion of the temperature function control TEMP key 36 the first schedule mandates the display of the second default temperature (20° C.). Assertion of the ENTER key 42 finalizes this value of the temperature parameter. Thus:

Prior to Step (1), field 30C reads *4
Step (1): input "TEMP" field 30C reads 20
The ENTER key 42 is then asserted.

EXAMPLE 2C-ALTERNATE TEMPERATURE PARAMETER VALUE

For this example it is assumed that the operator desires to exercise a protocol that requires a sample temperature of 15° C.

The last-used temperature value is displayed in the field 30C. Upon a first assertion of the temperature function control TEMP key 36, in accordance with the first schedule set forth above, the first default temperature (4° C.) is displayed. Using the keypad 40 the desired temperature value is now entered. Again assertion of the ENTER key 42 finalizes this value of the temperature parameter. Thus:

Prior to Step (1), field 30C reads 23
Step (1): input "TEMP" field 30C reads *4
Step (2): input "1" field 30C reads *1
Step (3): input "5" field 30C reads 15

The ENTER key 42 is then asserted. (It should be understood that either default value could be entered by keystroke, if desired.)

TIME

The interface method in accordance with this aspect of the present invention permits an operator to control the time duration of an operating run of a centrifuge instrument in either an elapsed time mode or an indefinite time mode ("HOLD"). The assertion of the time function control TIME key 38 produces a time change command. In response to a time change command a time control mode based upon the time control mode used during the preceding run is selected and displayed in accordance with the following schedule:

(i) if the stored representation of the last-used time mode is the elapsed time mode, the indefinite time mode ("HOLD") is selected and displayed; or (ii) if the stored representation of the last-used time mode is the indefinite time mode ("HOLD"), the elapsed time mode is selected and displayed.

The assertion of the ENTER key 42 again finalizes this value of the time parameter.

This aspect of the invention may also be understood by the following examples. It is assumed that an immediately preceding run was effected using the elapsed time mode for a period of two hours and thirty minutes.

EXAMPLE 2A ELAPSED TIME MODE

For this example it is assumed that the operator desires to exercise a protocol that uses elapsed time mode for a period of twelve hours and forty-five minutes. A representation of the last-used time control mode inferentially appears since the field 30T indicates the last-time value of two hours and thirty minutes. Upon assertion of the time control function TIME key 38, the default time control mode "HOLD" is displayed. (If this mode were desired, assertion of the ENTER key 42 at this point would finalize this selection.) However, upon entry of the desired elapsed time value using the keypad 40, the time control mode toggles to the elapsed time mode and the desired time value is entered. Assertion of the ENTER key 42 finalizes the time value. Thus:

Prior to Step (1), field 30T reads *2:30
Step (1): input "TIME" field 30T reads HO:LD
Step (2): input "1" field 30T reads **:*1
Step (3): input "2" field 30T reads **:12
Step (4): input "4" field 30T reads *1:24
Step (5): input "5" field 30T reads 12:45
The ENTER key 42 is then asserted.

EXAMPLE 2B ELAPSED TIME MODE

For this example it is assumed that the operator again desires to exercise a protocol that uses the elapsed time mode, again for twelve hours and forty-five minutes. However, if the last-used time control mode was the HOLD mode, upon assertion of the time function control TIME key 38 causes the field 30T to indicate the value of the most recent elapsed time mode run (assumed for this Example to be two hours and thirty minutes). The desired time value is entered via the keypad 40. Assertion of the ENTER key 42 finalizes the time value. Thus:

Prior to Step (1), field 30T reads HO:LD
Step (1): input "TIME" field 30T reads *2:30

Step (2): input "1" field 30T reads **:*1
Step (3): input "2" field 30T reads **:12
Step (4): input "4" field 30T reads *1:24
Step (5): input "5" field 30T reads 12:45
The ENTER key 42 is then asserted.

Figure 2:
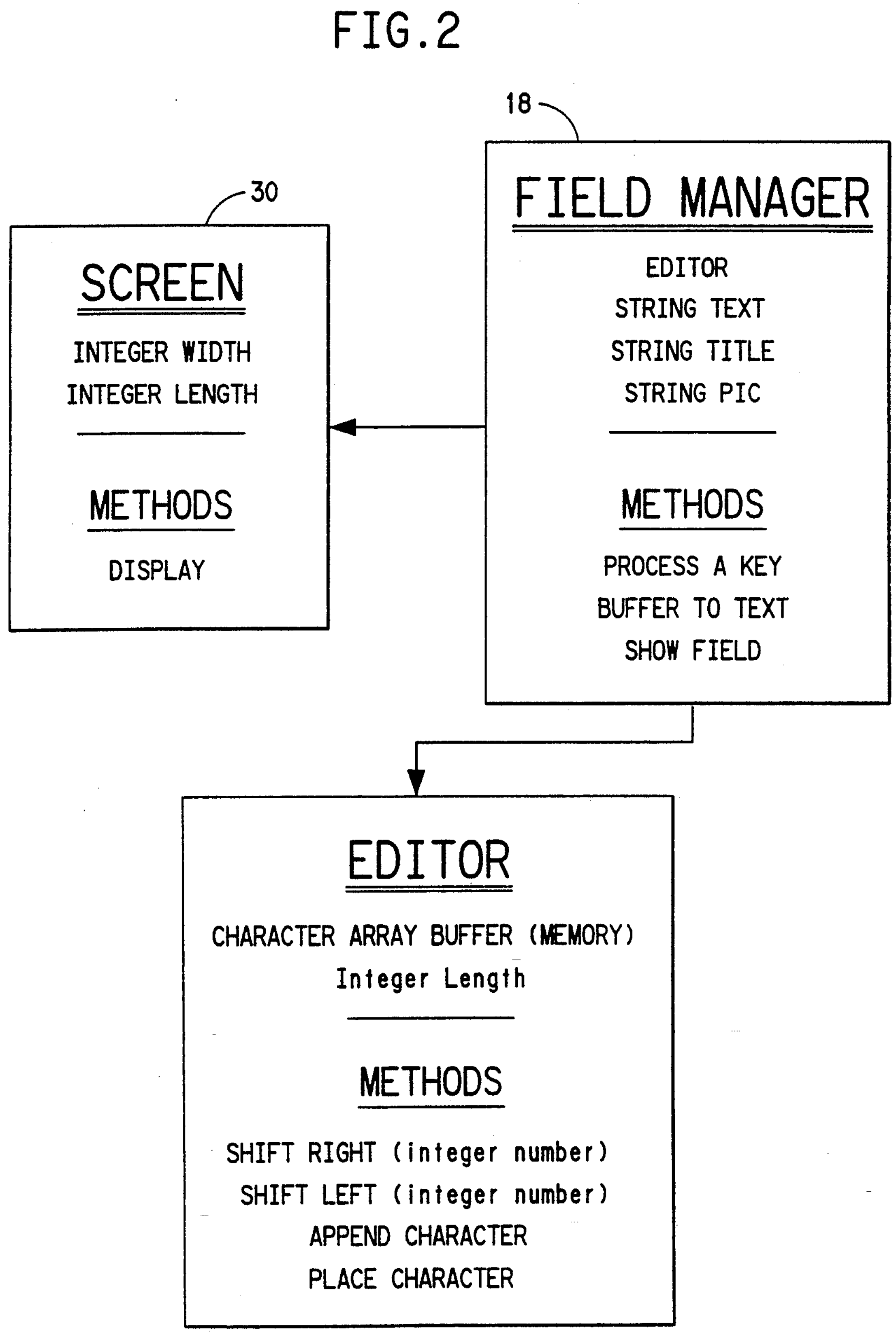
FIG. 2 is an entity relationship diagram of how the field manager program is implemented.

The preferred implementation of the field manager program 18 may be understood from the entity relationship diagram of FIG. 2. As noted, the field manager is preferably implemented in an object oriented programming language such as Borland C++ programming language. A state diagram may be expeditiously constructed by analysis of the "steps" and the resulting display as set forth in the above Examples. The assertion of the CE key 44 causes the editor to revert to the next-previous state.

To facilitate understanding the terms used in FIG. 2 shall mean the following:

INTEGER WIDTH means the number of characters top to bottom on screen 30;

INTEGER LENGTH means the number of characters across screen 30;

Integer Length means the length of the buffer memory;

DISPLAY means to display a string on the screen 30;

EDITOR is a program able to be called by the FIELD MANAGER program;

STRING TEXT means the actual text of the information displayed on the screen;

STRING TITLE means the title of a field in which the text is displayed;

STRING PIC means the string describing the format of a field in which the text is displayed;

PROCESS A KEY means to execute the steps required to process the information or command represented by a key 34 through 44 that is depressed;

BUFFER TO TEXT means the conversion of the EDITOR'S buffer memory to text;

SHOW FIELD means to send the field to the screen;

CHARACTER ARRAY BUFFER (MEMORY) means the storage area that holds values of the digits selected by the keys 40 for a given field;

SHIFT RIGHT means to shift characters in buffer to the right an integer number of places;

SHIFT LEFT means to shift characters in buffer to the left an integer number of places;

APPEND CHARACTER means to append a character to the end of the characters in buffer;

PLACE CHARACTER means to place a character at a position in the buffer.

Those skilled in the art, having the benefit of the teachings of the present invention may effect numerous modifications thereto. It should be understood that such modifications are to be construed to lie within the scope of the present invention, as defined by the appended claims.

What is claimed is:

1. In a method for inputting an operator-selectable value for an operational parameter of a centrifuge instrument, the value of the operational parameter being an N-significant digit number having a first subset of n significant digits and a second subset of significant digits, with $n<N$, the method comprising the steps of:

(a) for the entry by an operator of the first subset of significant digits, causing the value of the first subset of significant digits to be displayed as the product of a first multiplier; and (b) starting with the entry by an operator of one of the digits in the second subset of significant digits, causing each digit of the first subset along with the digits of the second subset as each digit in the second subset is being entered to be displayed as a product of a second, different, multiplier.

2. The method of claim 1 wherein the second subset comprises (N-n) significant digits with $n<N$.

3. The method of claim 2 wherein the first multiplier is greater than second multiplier.

4. In a method for inputting an operator-selectable value for an operational parameter of a centrifuge instrument that includes the steps of:

(a) upon the entry of the first significant digit of the selected value of the operational parameter, storing the value of that first significant digit in memory, (b) causing the value of the first significant digit stored in memory to be displayed in a position on a visual display corresponding to the thousands place in a base ten notational system, (c) upon the entry of the second significant digit of the selected value of the operational parameter, storing the value of that second significant digit in memory, (d) causing the value of the second significant digit stored in memory to be displayed in a position on a visual display corresponding to the thousands place in a base ten notational system while the value of the first significant digit stored in memory to be displayed in a position on the visual display corresponding to the ten-thousands place in a base ten notational system, the improvement comprising the further steps of:

(e) upon the entry of the third significant digit of the selected value of the operational parameter, storing the value of that third significant digit in memory, and (f) causing (1) the value of the first significant digit stored in memory to be displayed in a place on the display corresponding to the hundreds place in a base ten notational system, (2) the value of the second significant digit stored in memory to be displayed in the place on the display corresponding to the tens place in a base ten notational system, and (3) the value of the third significant digit stored in memory to be displayed in the place on the display corresponding to the units place in a base ten notational system.

5. The method of claim 4 wherein the improvement further comprises, after step (f), the steps of:

(g) upon the entry of an additional significant digit of the value of the operational parameter, storing the value of that additional significant digit in memory, (h) causing the last-stored value to be displayed in the place on the display corresponding to the units place in a base ten notational system, and (i) shifting the location on the display at which the previously-stored values are to be displayed by one place for the additional significant digit of the operational value stored that is in memory, and (j) causing the previously-stored values to be displayed at their corresponding shifted place on the display.

6. The method of claim 5 wherein the improvement further comprises, after step (f), the steps of:

(k) repeating steps (g) through (j) for each additional significant digit of the value of the operational parameter.

7. In a method for inputting an operator-selectable value for an operational parameter of a centrifuge instrument that includes the steps of:

(a) upon the entry of the first significant digit of the selected value of the operational parameter, storing the value of that first significant digit in memory, (b) causing the value of the first significant digit stored in memory to be displayed in a position on a visual display corresponding to the thousands place in a base ten notational system, (c) upon the entry of the second significant digit of the selected value of the operational parameter, storing the value of that second significant digit in memory, (d) causing the value of the second significant digit stored in memory to be displayed in a position on a visual display corresponding to the thousands place in a base ten notational system while the value of the first significant digit stored in memory to be displayed in a position on the visual display corresponding to the ten-thousands place in a base ten notational system, the improvement comprising, after step (d), the further steps of:

(e) upon the entry of a third significant digit of the selected value of the operational parameter, storing the value of that third significant digit in memory, and (f) causing (1) the value of the first significant digit stored in memory to be displayed in a place on the display corresponding to the thousands place in a base ten notational system, (2) the value of the second significant digit stored in memory to be displayed in the place on the display corresponding to the hundreds place in a base ten notational system, (3) the value of the third significant digit stored in memory to be displayed in the place on the display corresponding to the tens place in a base ten notational system.

8. In a method for inputting an operator-selected value for an operational parameter of a centrifuge instrument that includes the steps of:

(a) upon the entry of the first significant digit of the selected value of the operational parameter, storing the value of that first significant digit in memory, (b) causing the value of the first significant digit stored in memory to be displayed in a position on a visual display corresponding to the thousands place in a base ten notational system, (c) upon the entry of the second significant digit of the selected value of the operational parameter, storing the value of that second significant digit in memory, (d) causing the value of the second significant digit stored in memory to be displayed in a position on a visual display corresponding to the thousands place in a base ten notational system and the value of the first significant digit stored in memory to be displayed in a position on a visual display corresponding to the ten thousands place in a base ten notational system, (e) upon the entry of the third significant digit of the selected value of the operational parameter, storing the value of that third significant digit in memory, and (f) causing (1) the value of the first significant digit stored in memory to be displayed in a place on the display corresponding to the hundred-thousands place in a base ten notational system, (2) the value of the second significant digit stored in memory to be displayed in the place on the display corresponding to the ten thousands place in a base ten notational system, (3) the value of the third significant digit stored in memory to be displayed in the place on the display corresponding to the thousands place in a base ten notational system, wherein the improvement comprising the further steps of:

(g) upon the entry of the fourth significant digit of the selected value of the operational parameter, storing the value of that fourth significant digit in memory, and (h) causing (1) the value of the first significant digit stored in memory to be displayed in a place on the display corresponding to the thousands place in a base ten notational system, (2) the value of the second significant digit stored in memory to be displayed in the place on the display corresponding to the hundreds place in a base ten notational system, (3) the value of the third significant digit stored in memory to be displayed in the place on the display corresponding to the tens place in a base ten notational system, and (4) the value of the fourth significant digit stored in memory to be displayed in the place on the display corresponding to the units place in a base ten notational system.

9. The method of claim 8 wherein the improvement further comprises, after step (h), the steps of:

(i) upon the entry of an additional significant digit of the value of the operational parameter, storing the value of that additional significant digit in memory, (j) causing the last-stored value to be displayed in the place on the display corresponding to the units place in a base ten notational system, and (k) shifting the location on the display at which the previously-stored values are to be displayed by one place, and (l) causing the previously-stored values to be displayed at their corresponding shifted place on the display.

10. The method of claim 9 wherein the improvement further comprises, after step (l), the steps of:

(m) repeating steps (i) through (l) for each additional significant digit of the value of the operational parameter.

11. A method for inputting an operator-selectable value for a operational parameter of a centrifuge instrument, the instrument including a parameter function control key and a memory the memory storing a last-used operating value of the parameter, a first default parameter value, and a second default parameter value, the method comprising the steps of:

(a) in response to the first assertion of the parameter function control key, selecting a first default parameter value in accordance with the following first schedule:

(i) if the stored last-used operating value of the parameter is other than the first or the second default values, selecting the first default value, or (ii) if the stored last-used operating value of the parameter is the first default value, selecting the second default value, or (iii) if the last-used operating value of the parameter is the second default value, selecting the first default value.

12. The method of claim 11, further comprising the steps of:

(b) in response to the second assertion of the parameter function control key, changing the previously selected default parameter value in accordance with the following second schedule:

(iv) if the first default value of the parameter has been previously chosen in accordance with the first schedule, changing the selected value of the parameter to the second default value, or (v) if the second default value of the parameter has been previously chosen in accordance with the first schedule, changing the selected value of the parameter to the first default value.

13. The method of claim 11, further comprising the steps of:

(b) in response to the second assertion of the parameter function control key, toggling the previously selected default parameter value between the first or the second default values in accordance with the default value selected by the first schedule.

14. The method of claim 11 wherein the parameter is temperature.

15. A method for inputting an operator-selectable mode for controlling the time duration of an operating run of a centrifuge instrument, the instrument being controllable to run in either an elapsed time mode or an indefinite time mode, the instrument including a time function control key and a memory for storing a representation of the last-used time mode, the method comprising the steps of:

(a) generating a time change command upon the actuation of the time function control key, (b) in response to the occurrence of a time change command, selecting a time control mode in accordance with the following schedule:

(i) if the stored representation of the last-used time mode is the elapsed time mode, selecting the indefinite time mode, or (ii) if the stored representation of the last-used time mode is the indefinite time mode, selecting the elapsed time mode, and (c) inputting an operator-selected time value.

* * * * *